United States Patent Office 3,577,463
Patented May 4, 1971

3,577,463
SYNTHESIS OF STEROIDS
Patrick A. Diassi, Westfield, N.J., assignor to E. R. Squibb
& Sons, Inc., New York, N.Y.
No Drawing. Application June 11, 1968, Ser. No. 736,028,
now Patent No. 3,449,378, dated June 10, 1969, which
is a continuation-in-part of application Ser. No. 370,114,
May 25, 1964. Divided and this application Jan. 16,
1969, Ser. No. 791,794
Int. Cl. C07c *49/00*
U.S. Cl. 260—586   3 Claims

ABSTRACT OF THE DISCLOSURE

This invention relates to and has as its object the provision of new physiologically active steroids, processes for their production and novel intermediates useful in the preparation thereof.

---

This application is a division of my copending application, Ser. No. 736,028, filed June 11, 1968, now Pat. No. 3,449,378, which application is a continuation-in-part of my application Ser. No. 370,114, filed May 25, 1964, now Pat. No. 3,429,926.

More particularly, this invention relates to steroids of the formula

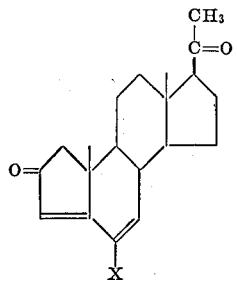

wherein X is halogen (e.g., chloro or bromo).

The compounds of this invention may be prepared according to the processes of this invention beginning with A-norprogesterone as starting material.

A-norprogesterone may be first treated with a halogenating agent, for example, 2,3-dichloro-5,6-dicyanobenzoquinone and a hydrogen halide, for example, hydrogen chloride or hydrogen bromide to yield the respective 7-halo-A-norprogesterone, which is a new compound of this invention.

The 7-halo-A-norprogesterones may then be dehydrogenated as by treatment with an organic base, such as collidine, at elevated temperatures to yield the 6-dehydro-A-norprogesterone, which is also a new compound of this invention.

6-dehydro-A-norprogesterone may then be oxidized as by treatment with a peracid, for example, m-chloroperbenzoic acid to yield the 6α,7α-oxido-A-norprogesterone, which is also a new compound of this invention.

6α,7α-oxido-A-norprogesterone may then be treated with an excess of a hydrogen halide, for example, hydrogen chloride or hydrogen bromide, at an elevated temperature to yield directly the respective 6-halo-6-dehydro-A-norprogesterone, which are new final products of this invention.

Alternatively, the 6-halo-6-dehydro-A-norprogesterone may be prepared by first treating 6α,7α-oxido-A-norprogesterone with 1 molar equivalent of a hydrogen halide, for example, hydrogen chloride or hydrogen bromide, at a reduced temperature, to yield the 6-halo-7-hydroxy-A-norprogesterones, which are also new compounds of this invention. The 6-halo-7-hydroxy-A-norprogesterones may then be treated with an excess of a hydrogen halide at an elevated temperature to yield the 6-halo-6-dehydro-A-norprogesterone final products of this invention. The compounds of this invention may be utilized in various ways including in admixture with a suitable carrier or carriers.

The compounds of this invention possess anti-androgenic activity and may be used in the treatment of such conditions as hyperandrogenic acne, the dosage and/or concentration being adjusted for the potency of the particular steroid and the requirements of the patient. Generally, a dosage of from 0.01 mg./kg. of body weight to about 1.0 mg./kg. of body weight is sufficient.

The invention may be further illustrated by the following examples:

EXAMPLE 1

7α-chloro-A-norprogesterone

To a solution of A-norprogesterone in dried dioxane, 2,3-dichloro-5,6-dicyanobenzoquinone is added and into the resulting solution a stream of hydrogen chloride gas is bubbled for 30 seconds. The reaction mixture is then left at room temperature for 16 hours during which time crystals of 2,3-dichloro-5,6-dicyanohydroquinone separate. The mixture is then filtered, washed with dioxane and the filtrate evaporated to dryness, in vacuo. The residue is dissolved in chloroform and plate chromatographed using Woelm neutral alumina (Activity 5) as adsorbant and chloroform as developing solvent. Detection of the band having Rf approximately 0.6 and elution with ethyl acetate followed by evaporation of the solvent, in vacuo, gives a residue which on crystallization from acetone-hexane yielded 7α-chloro-A-norprogesterone having a melting point of 124–126° C., +36.0° (chloroform), $$\lambda_{max}^{alc.} 232\ m\mu\ (\epsilon = 16,900)$$

*Analysis.*—Calc'd for $C_{20}H_{27}O_2Cl$ (percent): C, 71.65; H, 8.12. Found (percent): C, 71.62; H, 8.16.

EXAMPLE 2

7α-bromo-A-norprogesterone

Following the procedure of Example 1 but substituting hydrogen bromide for hydrogen chloride there is obtained 7α-bromo-A-norprogesterone.

EXAMPLE 3

6-dehydro-A-norprogesterone

A solution of 7α-chloro-A-norprogesterone in collidine is refluxed for 1 hour. After cooling it is diluted with chloroform and washed successively with 2 N hydrochloric acid, water, 5% sodium bicarbonate and water, then evaporated to dryness, in vacuo. The residue on plate chromatography using Woelm neutral alumina (Activity V) and chloroform as developing solvent gives a band detectable by ultraviolet at $R_f$ approximately .7 which on elution with ethyl acetate, evaporation of the solvent, in vacuo, crystallization of the residue from acetone-hexane yields 6-dehydro-A-norprogesterone having melting point 153–154° C., $[\alpha]_D^{22} + 89.5$ (chloroform), $$\lambda_{max}^{alc.} 277\ m\mu\ (\epsilon = 22,100)$$

EXAMPLE 4

6-dehydro-A-norprogesterone

Following the procedure set forth in Example 3, but substituting 7α-bromo-A-norprogesterone for 7α-chloro-A-norprogesterone, there is obtained 6-dehydro-A-norprogesterone.

EXAMPLE 5

6α,7α-oxido-A-norprogesterone

A solution of 6-dehydro-A-norprogesterone in methylene chloride is cooled to 0° C. and metachloroperbenzoic acid is added in small portions. The reaction mixture is kept at 0° C. for 30 minutes then allowed to come to room temperature and left stirring for 64 hours. The solution is then washed with 5% sodium bicarbonate, 5% sodium sulfite, and water and then evaporated to dryness in vacuo. The residue on plate chromatography using Woelm neutral alumina (Activity V) as adsorbant and chloroform as developing solvent gives a major band at $R_f$ 0.5 which is detectable by ultraviolet and is eluted with ethyl acetate. The ethyl acetate is evaporated to dryness in vacuo to give a residue which on crystallization from acetone-hexane gives 6α,7α-oxido-A-norprogesterone, having a melting point of 168–170° C. $[\alpha]_D^{22}$ +94.9° (chloroform), $\lambda_{max.}^{alc.}$ 234 m$\mu$ ($\epsilon$=13,100)

*Analysis.*—Calc'd for $C_{20}H_{26}O_3$ (percent): C, 76.40; H, 8.34. Found (percent): C, 76.37; H, 8.34.

EXAMPLE 6

6β-chloro-7α-hydroxy-A-norprogesterone

To a cold solution of 6α,7α-oxido-A-norprogesterone in chloroform is added dropwise a solution of hydrogen chloride in chloroform containing 50 mg. of hydrochloric acid per ml. The resulting solution is kept at 0° for 2½ hours then diluted with water. The chloroform is separated and the aqueous portion extracted with chloroform. The combined chloroform extracts are then washed with water until neutral and evaporated to dryness in vacuo. Crystallization of the residue from acetone-hexane gives 6β-chloro-7α-hydroxy-A-norprogesterone having a melting point of 244–246° C., $[\alpha]_D^{22}$ +26.9° (ethanol).

$\lambda_{max.}^{alc.}$ 234 m$\mu$ ($\epsilon$=14,800)

*Analysis.*—Calc'd for $C_{20}H_{27}O_3Cl$ (percent): C, 68.43; H, 7.76; Cl, 10.10. Found (percent): C, 68.30; H, 7.77; Cl, 10.02.

EXAMPLE 7

6β-bromo-7α-hydroxy-A-norprogesterone

Following the procedure of Example 6, however, substituting hydrogen bromide in acetic acid for the hydrogen chloride in the chloroform, there is obtained 6β-bromo-7α-hydroxy-A-norprogesterone.

EXAMPLE 8

6-chloro-6-dehydro-A-norprogesterone

A solution of 6β-chloro-7α-hydroxy-A-norprogesterone in chloroform is saturated with hydrogen chloride gas and the mixture heated at 40–45° C. for 22 hours. The solution is washed with 5% sodium bicarbonate with water until neutral and then evaporated to dryness, in vacuo. Chromatography of the residue on Woelm neutral alumina (Activity V) using ethyl acetate chloroform (1:9, v:v) as eluting solvent gives on evaporation and crystallization 6-chloro-6-dehydro - A - norprogesterone having a melting point of 138–140° C., $[\alpha]_D^{22}$ +98.2° (chloroform), $\lambda_{max.}^{alc.}$ 279 m$\mu$ ($\epsilon$=29,400)

*Analysis.*—Calc'd for $C_{20}H_{25}O_2Cl$ (332.86) (percent): C, 72.13; H, 7.57. Found (percent): C, 72.20; H, 7.70.

EXAMPLE 9

6-bromo-6-dehydro-A-norprogesterone

Following the procedure for Example 8 but substituting hydrogen bromide for the hydrogen chloride and 6β-bromo-7α-hydroxy - A - norprogesterone for 6β-chloro-7α-hydroxy - A - norprogesterone, there is obtained 6-bromo-6-dehydro-A-norprogesterone.

EXAMPLE 10

6-chloro-6-dehydro-A-norprogesterone

Following the procedure set forth in Example 8, but substituting an equivalent amount of 6α,7α-oxido-A-norprogesterone for 6β - chloro-7α-hydroxy-A-norprogesterone, there is obtained 6-chloro-6-dehydro-A-norprogesterone.

The invention may be variously otherwise embodied within the scope of the appended claims.

What is claimed is:

1. A compound of the formula

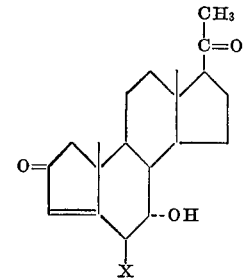

wherein X is halogen.

2. A compound in accordance with claim 1 having the name 6β-chloro-7α-hydroxy-A-norprogesterone.

3. A compound in accordance with claim 1 having the name 6β-bromo-7α-hydroxy-A-norprogesterone.

References Cited

UNITED STATES PATENTS 3,381,029   4/1968   Levine et al. _____ 260—488

BERNARD HELFIN, Primary Examiner

G. A. SCHWARTZ, Assistant Examiner